June 4, 1957  L. J. MOULTON  2,794,430
DUAL FUEL ENGINE CONTROL SYSTEM
Filed Feb. 26, 1952  2 Sheets-Sheet 1

INVENTOR.
L. J. MOULTON
BY George M Soule
ATTORNEY

June 4, 1957 L. J. MOULTON 2,794,430
DUAL FUEL ENGINE CONTROL SYSTEM
Filed Feb. 26, 1952 2 Sheets-Sheet 2

INVENTOR.
L. J. MOULTON
BY George N. Soule
ATTORNEY

United States Patent Office 2,794,430
Patented June 4, 1957

2,794,430

DUAL FUEL ENGINE CONTROL SYSTEM

Lloyd J. Moulton, Mentor, Ohio, assignor, by mesne assignments, to Curtiss-Wright Corporation, Marquette Metal Products Division, Cleveland, Ohio, a corporation of Delaware Application February 26, 1952, Serial No. 273,439

24 Claims. (Cl. 123—27)

The invention relates to a governor for engines capable of operating on two more fuels having inherently different characteristics in respect to metering, an object being to provide mechanism in the governor for automatically controlling an engine using such fuels in a manner (a) to insure the carrying of desired loads at required speeds without possibility of overloading the engine as by concurrent use of such two fuels and (b) to insure the full use of one of the fuels under all customarily practiced conditions of its supply before supplementing or replacing it with a second fuel.

In hydraulic speed governors for diesel engines the fuel-controlling servomotor position is usually an accurate indication or representation of load, or, in other words, the relationship of servomotor movement and fuel metering is linear. When such governor controlled engines are arranged for dual fuel operation (e. g. mainly on gas but as diesels for ignition and in event of gas failure) the servomotor position cannot be accurately indicative of load during operation on gas except when the engine operating ability of the gas is normal and the gas metering equipment is designed to match the generally linear output of the oil metering equipment. That follows from the fact that gas at sub-normal pressure (pressure being an example of an efficiency factor of gaseous fuel) requires a more fully open valve or throttle to enable the carrying of a predetermined load than it does at normal pressure. In other words the load-carrying ability of the gas is a function of both gas pressure and servomotor position rather than being a function of servomotor position alone. A further object of the invention, in reference to the foregoing discussion, is to provide a dual fuel engine governor wherein all the necessary output, i. e. engine control or governing functions, are performed automatically in and by a single governor mechanism whose servomotor position is at all times an accurate representation of load regardless of the type of fuel being used.

In L. J. Moulton applications, Serial No. 219,686, filed April 6, 1951, now Patent 2,690,167, issued September 28, 1954 (for identification Case A), and Serial No. 273,438, filed February 26, 1952, now Patent 2,734,490, issued February 14, 1952 (Case B), both relating to dual fuel engine governors, various arrangements are shown which are capable of automatically and accurately controlling speed and limiting load under the usual circumstances peculiar to dual fuel engine operation and particularly when partial or complete failure of the preferably or first used fuel occurs unexpectedly, thus requiring partial or complete conversion to an alternate fuel. The objects of the present invention generally include those of said Moulton applications, and, additionally, a novel or improved dual fuel governor mechanism operable automatically to obtain identical no-load or light load engine speeds with each fuel and each combination of two fuels as consequence of removal of operating load from the engine.

Another object is to provide an improved terminal shaft type of dual fuel engine governor, i. e., the elements of which are so arranged as to facilitate the obtaining of rotary output fuel control motion as through concentric shafts respective to the different fuels.

A specific object is to provide a governor-servomotor-operated dual fuel control mechanism with output elements adapted for connection with respective fuel-metering devices of the engine, wherein portions of the mechanism are automatically adjusted in response to an engine operating capability or failure function of one of the fuels in such a manner that the desired engine load/speed relationships will be maintained during and after partial and complete fuel conversions and reconversions.

Other objects and features of the invention will become apparent from the following description of exemplary embodiments shown in the drawings wherein.

Governor mechanism (typical)

Figure 1:
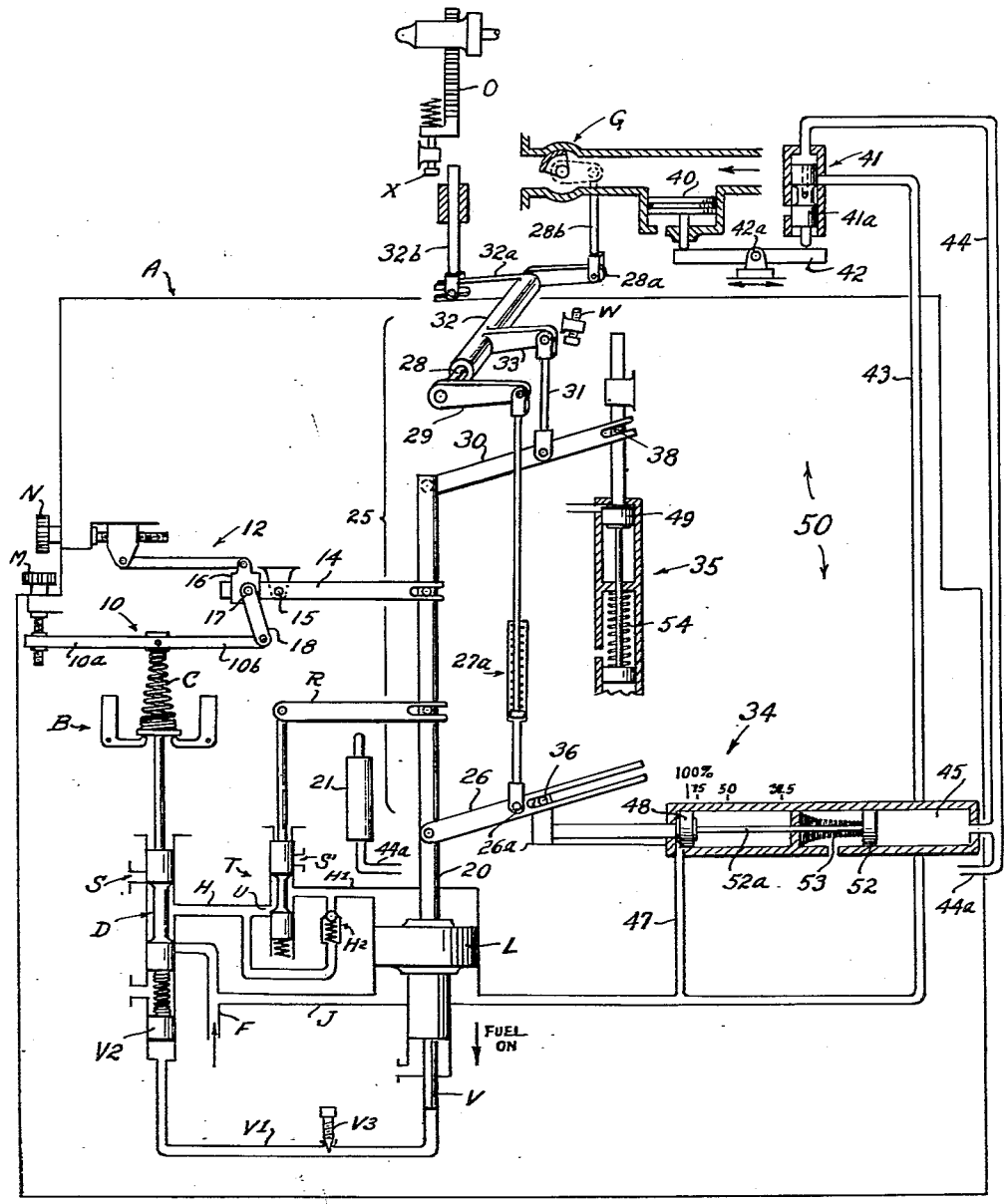
Fig. 1 is a schematic view showing one form of the present dual fuel control mechanism and an illustrative or typical governor the power output member L of which (hereinafter, for convenience, servomotor) mainly operates the control mechanism.

The governor A, as shown in Fig. 1, is what is commonly known as a hydraulic relay governor mechanism and has an engine-speed-change-detector B including flyballs, a speeder spring C and a pilot valve D. The pilot valve controls the operating effect of substantially constant pressure fluid (governor oil as from a pump and accumulator, not shown, admitted by line F) on a servomotor, the output member whereof is represented by power piston L. Passages H and H1 between the pilot valve servomotor are normally interconnected. Governor oil, in the illustrated equilibrium or steady-state position of the pilot valve is trapped in contact with relatively larger area (upper face) of the power piston L whose smaller (lower face) is continually subjected to governor oil pressure through line J.

To cause "fuel-on" (downward) movement of the power piston L the pilot valve D (by lowering as in response to diminished engine speed) admits governor oil to the upper cylinder chamber of the power piston, and, to cause "fuel-off" or reverse piston movement, the pilot valve is raised and then spills oil at pilot valve sump connection S.

Load limit valve T connecting oil lines H and H1 is operated by a lever R connected for load limiting purposes to the power piston L, as through its tailrod 20. The lever R, partly as a function of governor servomotor motion and partly as a function of the position of a variable fulcrum, causes spill of oil from the larger power piston cylinder chamber through sump-connected port S1 after cutting off line H at port U. The operation of the load limit valve T can be controlled as a fuel-failure-function through fluid motor unit 21 as will be explained below, which acts as such variable fulcrum for the lever R. A one-way spring-loaded valve H2 is shown in by-passing relationship to valve T so that the governor can always control fuel-off movement of the power piston.

A hydraulically acting feedback (temporary speed droop) system between the governor power piston L and its pilot valve D is diagrammatically represented as comprising an actuating displacement pump V; oil passage V1; receiving piston V2 which is spring-connected to the pilot valve and a needle valve V3 for adjusting leakoff.

The system is substantially that of A. Kalin Patent 2,219,-229, dated October 22, 1940.

The governor A, as shown, has a well known type of speed setting mechanism including a lever 10 connected between its ends to the speeder spring C. End portion 10a of the lever is subject to speed setting operation as by a hand knob M or suitable power means not shown. End portion 10b has a fulcrum which is movable by governor power piston action for modifying the speed setting according to load as reflected by power piston position, that being the essential action of a conventional permanent speed droop linkage customarily employed in hydraulic relay governors. Speed droop linkage 12, as shown, includes a lever 14 supported on a fixed pivot 15 and a block 16 slidable along the lever and carrying a movable pivot 17 connecting a link 18 to speeder lever end portion 10b. The free end of lever 14 is connected to the power piston L, as by means of piston tailrod 20, so that lever 14 will be lowered and raised progressively by power piston action. Movement of the slide block 16, as by speed droop adjustment knob N connected therewith, changes the distance between pivots 15 and 17 and thereby varies the amount of speed-setting-modification or speed droop from zero (pivots 15 and 17 aligned) to any desired value.

Dual fuel control mechanism

The dual fuel control mechanism generally indicated at 25, Fig. 1, is operated conjointly by the governor servomotor L and an apparatus 50 (considered part of mechanism 25) which is designed to be responsive to a variable engine operating capability characteristic of the gas, for example its pressure (assuming the gas has a constant B. t. u. content as can be assured by known means not shown). An "engine-operating-capability characteristic" of an engine fuel, as that expression is used herein, means any characteristic of the fuel which may be variable and which for a given value of that characteristic, all other engine affecting variables being fixed, determines the load which the engine is capable of carrying. Apparatus 50 operates in such manner that gas is the only fuel fed to the engine as long as that fuel is capable of carrying the desired or necessary load, and in such manner that when or if the gas is incapable of carrying the load it is either supplemented with or is replaced by a proper quantity of oil as required by the load. Said apparatus 50, in cooperation with other parts of mechanism 25, automatically varies the ratio between servomotor movement and gas-valve-operating output movement of the mechanism 25 so that the amount of valve opening is properly mated with existing gas pressure, and simultaneously varies the relative position between the servomotor and oil-metering output element of the mechanism so that the servomotor-imparted range of movement of that element causes the required amount of oil to be supplied for either partial or complete conversion. Full conversion to oil occurs in event of a practically complete gas failure which signifies a reduction in gas pressure to such a point that it is no longer feasible or safe (matters which depend upon engine type, design, service, etc.) to use gas as the engine's fuel. Threshold pressure controlling instruments are commonly used to shut off the gas supply when its pressure is in the neighborhood of half of normal engine operating gas pressure. Normal gas pressure, as referred to herein, means the pressure at which, with a given gas (B. t. u. rating) the engine will carry full or rated load at rated speed with a fully open throttle. The gas metering equipment of the engine should be so designed in relation to the oil metering equipment that full load position of the governor servo mechanism on gas is the full load position for oil.

Same (typical construction: Fig. 1)

Mechanism 25, as shown schematically in Fig. 1 comprises: (a) a gas-metering, servomotor-connected floating lever 26, output link assembly 27 thereof shown as pivotally attached to the lever at 26a, and a terminal shaft element 28 connected to the link assembly for operation thereby as through an arm 29 on the shaft element; (b) a servomotor-connected, oil-metering floating lever 30 operatingly attached as by output link 31 to a terminal shaft element 32, as through an arm 33 on the associated element, and (c) a fuel-failure-responsive power amplifying apparatus or mechanism 50, fluid motor output means 34, 35 of which modifies the servomotor-imparted output action (movement and/or position) of the two floating levers 26 and 30 as will be more fully described below. Fluid-operated motor mechanism 34 (part of 50) operates automatically in response to gas pressure fluctuations to adjust a fulcrum 36 of gas-metering, floating lever 26 and, concurrently, a preferably separate fluid-operated motor mechanism 35, similar to 34, automatically adjusts a fulcrum 38 of oil-metering floating lever 30 in a manner to permit conjoint use of gas and oil in proper proportions, as will be explained, and to effect complete conversion to oil. A single fluid motor mechanism (34 or 35) can be arranged for simultaneous adjustment of the two fulcrums.

The floating levers 26 and 30, as shown, are pivotally connected to the servomotor L through its tailrod 20; and it is assumed that all parts of the mechanism 25 thus far referred to would, in practice, be proportioned and designed to be contained in the governor casing, not shown. Thus the terminal shaft elements 28 and 32 would have suitable bearings (not shown) and be extended out of the governor case for connection as by linkage assemblies 28a, 28b and 32a, 32b respectively with the gas and oil fuel metering devices of the engine.

A gas metering device is shown at G in the form of a conventional rotary valve in gas manifold portion E, the valve being illustrative of the type of gas metering device the control port adjustment of which is a generally linear function of control movement imparted thereto as by the associated governor terminal shaft 28. An abutment W, shown for example in position to make contact with gas-valve-operating lever 28a, prevents movement of the gas valve in its port-opening direction beyond full flow position (i. e. prevents reclosing movement); and, when such operating-motion-limiting is practiced, a yieldable device, e. g. spring 27a of link assembly 27, is incorporated somewhere in the linkage. An oil metering device is represented as a conventional injector pump having a control rack O for cooperation with part 32b, shown as a pushrod, the rack being illustrated as blocked in pilot-injection position as by an adjustable abutment X.

As a suitable means for accurately, and with appropriate force, adjusting the fulcrums 36 and 38 of the two floating levers 26 and 30 in response to an engine-operating-capability-variation of the gas, an operative equivalent of a gas-pressure-sensitive relay or pressure amplifier "50" of Moulton Case B is shown herein. Gas-pressure-sensitive input means of relay, etc. 50 hereof, Fig. 1, includes, as shown, an actuating, pressure-detector element 40—shown as a piston which is continually exposed on one side to pressure of the engine gas supply ahead of the control valve G with respect to the indicated direction of gas flow to the engine—and an actuated piston valve 41a of an oil pressure regulator unit 41. Lever 42, having an adjustable fulcrum 42a, forms a variable-ratio actuating connection between gas-pressure-detecting element 40 and oil-pressure-regulating piston valve member 41a, thus enabling adjustment of relay output oil pressure in correlation with the engine operating gas pressure.

Governor oil supplied to pressure regulator unit 41, as through passage 43, is maintained in a regulated-pressure-oil passage 44 leading to a receiving displacement chamber 45 of relay output fluid motor unit 34 which, as shown, adjusts the fulcrum 36 of the floating lever 26. Unit 35 for adjusting fulcrum 38 of floating lever 30 preferably forms the output of a similar pressure amplifying apparatus, not shown. Output units 34 and 35, as functionally suitable arrangements, comprise power head or follow-up piston/valve mechanism of well known type wherein an easily operable pilot valve plunger controls the position of its associated power head piston 48 or 49. One such power head mechanism is fully shown in Moulton Case B, Fig. 2a thereof. Herein, as an example, the power head piston 48 of unit 34 is supplied as through passage 47 with operating pressure oil (porting not shown) and a piston 52 biased by a spring 53, to be further described, against the regulated pressure of oil in chamber 45, actuates the power head piston 48 through action of a pilot or follow-up valve 52a (porting not shown) connected to the spring biased piston.

Adjustment of the fulcrum 42a of relay input mechanism lever 42 along said lever is the equivalent of adjusting the loading of the receiving-piston-biasing spring 53, as will be apparent, thus enabling the power head piston 48 to move to a predetermined position in its cylinder from an assumed residual-manifold-gas-pressure-representing position to the illustrated normal-gas-pressure-representing position of the power head piston notwithstanding non-uniformity of gas pressure values in different installations.

If, in lieu of the effective biasing-spring-loading adjustment 42, 42a just above described, provision were to be made directly to adjust the spring loading in both units 34 and 35, as could be done, then a single pressure relay input apparatus 40, 41 could supply the oil receiving chambers 45 of both units. In the Fig. 1 arrangement it is desirable that the power head pistons 48 and 49 have relatively different operating characteristics, as will be explained, as functions of gas pressure variations.

To adjust the gas-metering output of floating lever 26 so that said output varies according to gas pressure and governor servomotor position, fulcrum 36 is moved generally longitudinally of said lever; and to adjust the oil-metering-output position of floating lever 30 in respect to servomotor position and as a gas pressure function the fulcrum 38 is moved transversely of its lever 30. In most installations the fulcrum 38 of the oil metering lever 30 should be adjusted as a linear function of gas pressure variations, whereas, with the illustrated gas metering lever mechanism, in order to cause proper ratio-varying adjustment of the fulcrum 36 the fulcrum positioning must be a non-linear function of gas pressure variations. Accordingly the biasing spring 54 of unit 35 usually has a uniform scale and the spring 53 of unit 34 has a gradually changing scale as is indicated by the gradually enlarged diameter coils at one end of that spring. Thereby, in reference to the gas metering mechanism, as the regulated pressure in the receiving chamber 45 drops, the power head piston 48 moves disproportionately to the right, greater distances with each successive unit drop in pressure.

*Operation (Fig. 1)*

The various parts are shown in the relative position occupied when the engine is operating at half rated load on normal gas pressure, the illustrated mid-position of the servomotor being assumed appropriate for 50% load solely on oil. Gas valve G is shown midway between open and closed positions, as a schematic representation of a half open valve such as can be assumed correct for the 100% or normal gas pressure mentioned at half load.

At zero load (servomotor at the top of its permitted stroke) the ratio-varying, gas-valve-operating floating lever 26 would be horizontal and then a drop in the gas pressure reflected by movement of power head piston 48, hence fulcrum 36, to the right would have no effect on the gas valve. Such is necessary in order that gas valve opening movement will always be, at least in part, a function of servomotor movement. Otherwise in a low-load or zero-load position of the servomotor such as to restrict the engine to pilot oil operation a partial failure of the gas would accelerate the engine as would manifestly be undesirable.

With normal gas pressure, hence the illustrated position of fulcrum 36, when the servomotor L is caused to move, in response to normal governor action upon increase of load, to full fuel position (which may be its cylinder-bottoming position, not shown) the design should be such that the gas valve will be fully opened. Now, if the gas pressure drops to threshold value (gas supply then cut off by means not shown) the gas valve will remain open (spring link element 27a compressed idly), but the fulcrum 38 of oil-metering floating lever will, by the gas-pressure-responsive power head action of mechanism 35, then have been moved downwardly the proper distance to bring the control-shaft-connected pushrod member 32b into contact with its oil fuel rack O and will have moved the rack into full-fuel-metering position. The necessary lost motion between governor output and the fuel metering device can, incidentally, be a built-in feature of an otherwise ordinary fuel pump as by helix design, not illustrated.

During partial gas failure conditions, short of full effective (to or below-threshold) pressure failure, the gas valve will be opened by servomotor action, in cooperation with rightward movement of gas lever ratio-varying fulcrum 36, so as to permit all the available gas to be used; and, only when necessary in order to carry the assumed load, the lost motion between the pushrod 32b and its injector rack will be taken up and the rack will be moved to enable an appropriate part of the load to be carried on oil. Since the present arrangement operates to prevent oil from being used to carry any part of the operating load until the gas valve has been fully opened and the gas is then wholly or partially inadequate to carry the load, the automatic adjustment of the gas valve from closed to fully open position cannot result in overloading of the engine by concurrent use of gas and oil.

For proper adjustment of the gas valve to meet any condition resulting from partial gas failure in which the assumed torque load can still be carried on gas alone, the operating ratio between gas valve opening movement and servomotor movement must be increased in such relation to the drop in gas pressure as will maintain a gas fuel torque-producing input corresponding to the oil fuel torque-producing input for such assumed load, hence servomotor position. In practice the proper gas valve adjustment for any combination of gas pressures and loads within the gas capacity is effected if the gas metering port opening, expressed as a fraction of maximum opening equals the reciprocal of the gas pressure expressed as a fractional part of normal pressure multiplied by the load expressed as a fraction (e. g. fractional part of servomotor travel from no load to full load). Some examples under the above rule will later be demonstrated in connection with Fig. 2.

The ratio-varying adjustment produced by the gas metering portion of the present mechanism 25, assuming first that the fulcrum 36 is adjusted as a linear function of gas pressure variation (such as would be the case if biasing spring 53 had a constant rate) is as follows: The relative lengths of the two effective arms of gas metering floating lever 26 (arms defined in part by lever connection 26a with link 27) are varied by the gas-pressure-responsive action of power head piston 48 in moving fulcrum 36 so that, as gas pressure is reduced, for example, a predetermined servomotor movement tends to produce greater and greater gas-valve-opening movement of link assembly 27. Concomitantly, the angularity between lever 26 and the path of movement of the fulcrum becomes greater as the servomotor approaches its full load position, hence given amounts of gas pressure failure, even if resulting in equal amounts of power head movement as assumed above, have increasing gas-valve-opening effect as the servomotor moves in its fuel-increasing direction.

While the actions just above described can, by appropriate design expedients, be used in practice to correlate gas valve opening movement with varying gas pressures and varying loads at least within certain ranges of load and gas pressure variation, it is recommended, for full practical range operation, that said actions be further automatically modified or compensated as a function of gas pressure change. Such modification is afforded, for example, by the use of the varying rate biasing spring 53 earlier referred to herein for regulated-oil-receiving piston 52. A cam mechanism 60, 61 of Fig. 2 has essentially the same linkage-action-modifying effect on the positioning of the associated fulcrum 36′ as does the spring 53 on the positioning of fulcrum 36 of Fig. 1, hence one detailed explanation of operation, appearing later herein, will suffice for both arrangements.

It will be apparent from inspection of Fig. 1 that no speed resetting of the governor mechanism is necessary during fuel conversion operations since servomotor position is independent of those operations. As already explained the engine cannot be overloaded by concurrent use of gas and oil, but in order to prevent overloading of the engine by gas at pressures materially greater than the normal (usually regulated) operating pressure, the motor device 21 (constructed similarly to the assembly comprising piston 52 and its chamber 45 and having a suitable connection to regulated pressure as at 44a (counterpart of motor device 21 shown in Moulton Case B) can be arranged to establish a load-limit-valve-operating fulcrum for lever R.

Fluctuations of minor nature above normal operating gas pressure can, by design of the power head mechanism 34 such that the piston 48 is permitted to move to the left (Fig. 1) of its 100% gas-pressure-representing position (for example a .105% position), be made to perform corrective ratio adjustment so as to maintain constant engine load for a given servomotor position notwithstanding such fluctuations.

Upon complete removal of any operating load from the engine, regardless of what fuel or combination of fuels has been carrying the load (still assuming that the gas metering mechanism is designed to require the same servomotor stroke in going from no fuel to full fuel as is required for oil) the servomotor, hence the fuel metering devices, cannot be moved out of position proper to no-load by resurgence of gas or any variation of its supply pressure.

Figure 2:
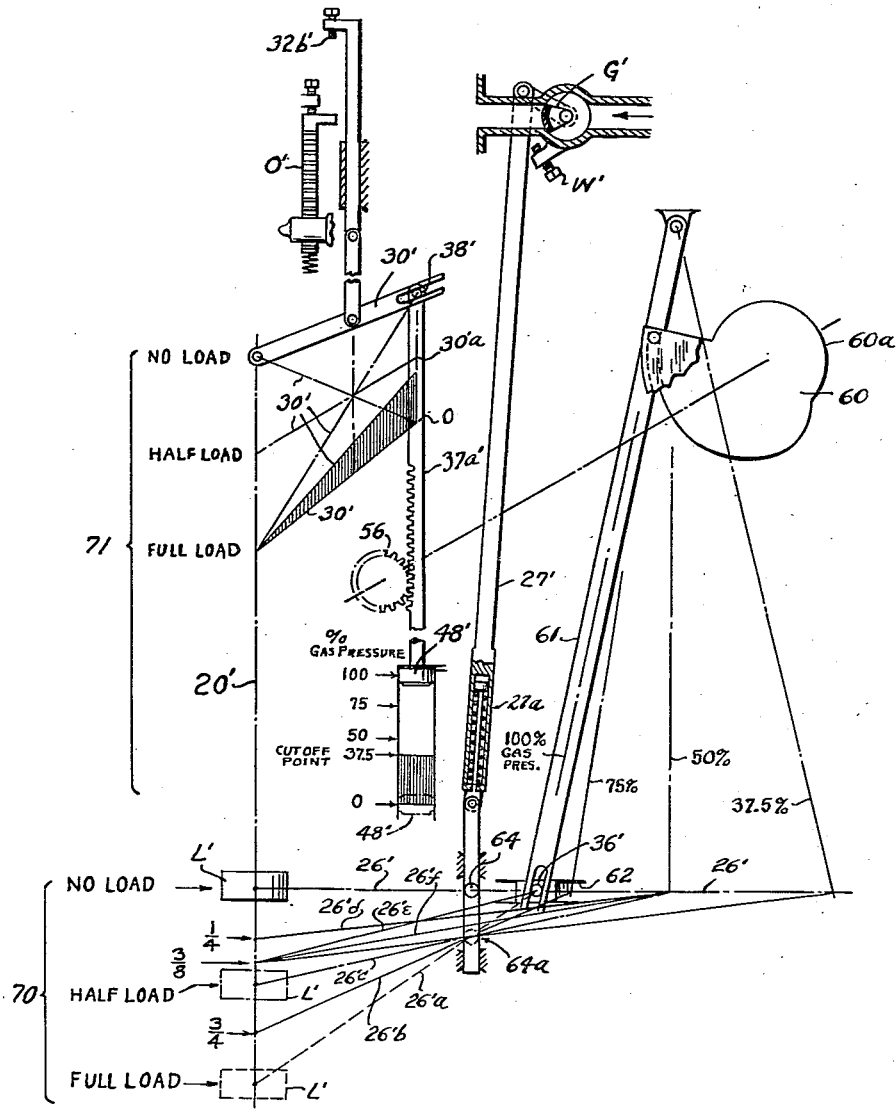
Fig. 2 is a similar diagrammatic view of a somewhat different form of dual fuel control mechanism hereof wherein certain parts are represented in several typical positions illustrative of fuel conversion operations.

*Fig. 2 form*

In this view the parts (or lines representing the parts) corresponding in function to those of Fig. 1 are given the same characters but primed. The governor servomotor piston L′ is shown diagrammatically in full lines in no-load position and in broken or dotted lines in half load and full load positions as identified on the drawing. Gas-pressure-responsive power head piston 48′ directly operates a member 37a′, shown as a rack for direct adjustment of the fulcrum 38′ of oil metering floating lever 30′. The rack, as through a pinion 56, operates rotary cam 60 which, in turn, through a lever 61 is connected to the fulcrum 36′ for adjustment of it along an appropriate fixed guide 62 which is parallel to the zero load indicating i. e. horizontal direction of extent of the floating lever 26′ (incompletely shown). Floating lever 26′ is assumed to have a slot embracing the fulcrum 36′ in a manner analogous to the corresponding lever and fulcrum arrangement according to Fig. 1. The floating lever is suitably connected to its yieldable link assembly 27′, for operating the gas valve G′, through a pivot pin 64 on the link shown as fixedly guided for movement normal to the direction of extent of the floating lever in the no-load position of the servomotor.

The cam 60 is appropriately shaped so that the combined functions of servomotor position according to load (acting through lever 26′ in its various angular positions) and fulcrum position according to gas pressure fluctuations result in valve-adjusting positions of linkage pivot 64 which vary in linear relationship to gas pressure fluctuations (power head movement) regardless of servomotor position. The cam 60, etc. of Fig. 2 cancel the inherent non-linearity between gas-pressure-responsive power head movement combined with servomotor-imparted, valve-operating or output movements of the floating lever mechanism such as would obtain if the power head position varied directly with gas pressure. Thereby, assuming that variations in the gas valve metering port areas of valve G′ are linear functions of predetermined valve-operating movements imparted as by link assembly 27′, the load carried by gas is constant for any servomotor position within the load carrying ability of a varying gas supply.

Diagram 70 at the bottom of Fig. 2, represents various relative positions of floating lever 26′ and the connecting pivot 64 of the link assembly 27′, said pivot of the assembly being moved vertically to its various positions as combined functions of load and gas-pressure variations as will be apparent from inspection. Position 64a and the floating-lever-representing lines 26′a, 26′b, and 26′c intersecting the pivot in that position of it indicate certain maximum loads that can be carried solely on gas at the percentages of normal gas pressure noted beside cam-operated lever 61 and with a fully opened gas valve. Thus full load is carried at 100% (of normal) gas pressure, half load at 50% gas pressure, etc.

As a specific example of partial load versus subnormal gas pressure it is seen from the diagram, that with the servomotor L′ in the indicated ¼ load position and the effective gas pressure at 50% of normal (see line 26′d) the gas valve will be adjusted to restrict its metering port to ½ fully open position. Similarly with a ⅜ load at 100% gas pressure the gas valve, as indicated by line 26′e, would be three-eighths open; and, by reference to line 26′b, with the same load at 50% gas pressure, the gas valve would be ⅔ open.

Assuming half load and 50% gas, it will be apparent that if the servomotor, due to increase in load, is now moved by governor action in the fuel increasing direction beyond "half load" position the gas valve will have been opened to blocked position (stop W′) but oil must then supplement the gas. Referring to the Diagram 71—upper left, Fig. 2—showing the oil metering mechanism floating lever 30′ in various positions by intersecting lines, it will be seen that when the floating lever 30′ is at the indicated "half load" position and the power-head-connected end of the lever is at position 30′a (gas pressure 50% of normal) the abutment 32b′ of the oil-metering linkage will be in contact with the oil rack O′ in order to begin to supplement the 50% gas with the proper amount of oil to carry any further increase in load.

Assuming the engine is being operated at full or rated load, then should the gas pressure fall to the point at which it is no longer desirable to use gas (e. g. 37.5% of normal in the particular arrangement shown) the gas is cut off to the supply line, which may be through a governor controlled relay or the like (not shown) actuated for example by rack 37a′ or by the lever 61. As the gas pressure drops to negligible value, for convenience zero pressure, the power head piston 48′, hence floating lever 30′, move through the shaded areas of the Diagram 71 to zero gas pressure position, so that subsequent engine operation will involve only the oil-metering linkage. Meanwhile the cam 60, by an appropriate dwell portion 60a, can retain the lever 61 in its extreme position appropriate to the indicated minimum useable gas pressure (cut off point) so that the valve G′ will be held open to some extent so long as the engine is carrying any load.

Figs. 1 and 2 are to be considered mutually complementary of each other. For example, the coaxial terminal shaft arrangement of Fig. 1 would preferably be used in place of the diagrammed fuel linkage of Fig. 2.

I claim:

1. In combination with an internal combustion engine governor having a governor output motor member and actuating means for causing movement of it in a predetermined path, first and second fuel control mechanisms respectively connected for operation by the motor member and adapted for operating metering means for two fuels which fuels have relatively different metering characteristics, the ratio between motor member movement and fuel control output movement of the first mechanism being adjustable to vary the extent of output movement with a given amount of motor member movement; the relative position between the motor member and fuel control output movement of the second mechanism being adjustable to vary the effective range of motor-member-imparted output movement, and means responsive to variations in an engine-operating-capability characteristic of one of the fuels, said means being connected and arranged to effect both said adjustments.

2. The combination according to claim 1 wherein both fuel control mechanism are continuously connected for operation by the motor member to enable concurrent use of the two fuels.

3. An internal combustion engine governor having an output motor member and actuating means for causing movement of it in a predetermined path, characterized in that: first and second mechanisms adapted for operating metering means for two fuels having relatively different metering characteristics are connected for operation by the motor member, whereby to enable first-used and second-used fuel control; the ratio between motor member movement and the fuel-control output movement of the first mechanism being adjustable; the relative position between the motor member and fuel-control output of the second mechanism being adjustable, and means for effecting both adjustments as an engine-operating-capability characteristic of the first-used fuel.

4. In a governor for an internal combustion engine which has fuel metering devices for first and second used fuels having relatively different metering characteristics, the second of which fuel is for use in case of failure of the first, a main governor output motor member and means for actuating it, fuel control mechanisms connected for operation by the motor member and having respective fuel control output means for causing operation of said devices, means included in the first fuel control mechanism for adjusting the ratio between motor member movement and the resulting movement of the control output means, means included in the second fuel control mechanism for adjusting the motor-member-imparted position of the control output means of that mechanism, and first-fuel-failure-responsive means operatingly connected to respective adjusting means to effect both of said adjustments simultaneously.

5. In a governor for an internal combustion engine which has fuel metering devices for a main and a supplementary fuel, which fuels have relatively different metering characteristics, the governor having an output motor member and means for actuating it, fuel control mechanisms continuously connected for operation by the motor member and having respective fuel control output means for enabling concurrent operation of said devices, means operable to adjust the ratio between motor member movement and the resulting movement of the control output means of the main fuel control mechanism, means operable to adjust the relative position between the motor member and the fuel control output means of the supplementary fuel mechanism so as to render that output means ineffectual or effectual to cause metering of supplementary fuel during engine operation on the main fuel, and main-fuel-failure-responsive means connected and arranged to operate both adjustment means simultaneously.

6. A governor for a dual fuel internal combustion engine having a metering means for gas and metering means for oil, the governor having an output motor member and means for actuating it, fuel control mechanisms connected for transmitting the motion of the motor member for enabling gas and oil metering respectively, the gas control mechanism including adjusting means to cause the transmitted output of that mechanism to vary in amplitude relative to the motion of said motor member, and the oil control mechanism including adjusting means to cause the transmitted output to vary in position so as to have an inactive range of motor-member-imparted movement and a generally corresponding active range, and gas-failure-responsive motor means connected to each adjusting means and operating simultaneously to increase the relative amplitude of the gas controlling output movement to governor output motor member movement and to move the oil controlling output into the active range, each generally in proportion to the amount of gas failure.

7. A governor for a dual fuel internal combustion engine having separate metering devices for first and second fuels and respectively connected, motion-receiving parts for operating the devices, the governor having a motor member and means for actuating it, first-fuel-controlling mechanism connected to the member for operation of the mechanism, a separate second-fuel-controlling mechanism continuously connected with the motor member for operation of that mechanism, the same having output means which is variable in position relative to the motor member so as to have an inactive range of motor-member-imparted movement wherein the motion-receiving part of the first fuel metering device is not encountered by said output means and a generally corresponding active range wherein that part can be encountered by said output means, and first-fuel-failure-responsive means connected to the second-fuel-controlling mechanism and operating to move said output means into its active range distances substantially proportional to the amount of first fuel failure.

8. A governor for an internal combustion engine having devices respectively adapted to meter two fuels having relatively different metering characteristics, said governor having an output motor member and means for actuating it, two floating levers connected with the motor member for operation thereby, fulcrums for the levers one movable longitudinally of its associated lever to vary the amplitude of its motor-member-imparted stroke relative to the movement of said motor member and the other fulcrum being movable transversely of its associated lever to vary the motor-member-imparted range of operation of said associated lever, output means for connection of the levers to respective fuel metering devices, and mechanism responsive to variations in an engine operating characteristic of one of the fuels and connected to the fulcrums for adjusting them simultaneously.

9. In a governor for an internal combustion engine having devices respectively adapted to meter first and second fuels, the governor having an output motor piston and control means connected to cause movement thereof in opposite directions to increase and decrease fuel metering, respective fuel-controlling levers swingable in planes generally parallel to the piston axis and each pivotally connected to the piston, output elements for the levers for transmitting their fuel controlling motions, a supporting fulcrum for the first-fuel-controlling lever movable along that lever in a manner to enable variation in the amplitude of movement of its output element, a supporting fulcrum for the second-fuel-controlling lever movable in a direction generally parallel to the piston axis to enable variation in the piston-imparted range of operation of the second-fuel-controlling output element from and to active and inactive positions, and first-fuel-failure-responsive means connected to the fulcrums to move them simultaneously in directions to cause increased first-fuel-metering action of the first-fuel-controlling output element and active fuel metering range operation of the second-fuel-controlling output element generally in proportion to the amount of fuel failure.

10. A governor for a dual fuel internal combustion engine having metering means for gas and oil, the governor having an output motor member and means for actuating it, a floating lever connected to the motor member for movement thereby and having an oil control output element, a movable fulcrum for the lever arranged to vary the position of the motor-member imparted range of motion of the oil control output element between non-oil-metering and oil-metering positions, mechanism operative to impart motor member motion to the gas metering means, and gas-pressure-responsive means connected to move said fulcrum and shift said oil control output element into operating position in respect to the oil metering means when the gas pressure falls to a predetermined low value.

11. A governor for an internal combustion engine having fuel metering means for a fuel the engine-operating capability of which may vary per unit of fuel, the governor having a motor member and means for actuating it, mechanism connected with the motor member and having an output member moved thereby for operating the fuel metering means, means in said mechanism capable of adjustably fixing the ratio between motor member movement and output member movement, and fuel-failure-responsive means connected to the ratio-fixing means and operating thereon to cause increase in the motor member-imparted movement of the output member generally in proportion to the amount of fuel failure.

12. A governor for an internal combustion engine having metering means for a gaseous fuel, the governor having an output motor member and means for actuating it, a lever connected to the motor member for movement thereby and having a gas-control-output element, a movable fulcrum for the lever arranged to vary the ratio between the motor member movement and the gas-control-output element movement, and gas-pressure-responsive means connected to move said fulcrum in a direction to increase the amplitude of motor-member-imparted, gas-control-output movement as the gas pressure diminishes.

13. In a governor for an engine operable on gaseous fuel, a governor output motor member and means for actuating it, said member being movable from an initial position in order to open a gas valve of the engine, a lever connected to the motor member and having an arm extending in a predetermined direction in said initial position of the motor member, a shiftable fulcrum for the lever guided for movement parallel to said direction of extent of said lever arm, gas-valve-operating means connected to said arm, and engine-gas-supply-pressure-responsive means connected to the fulcrum for movement of it in a direction to increase the motor-member-imparted movement of the gas-valve-operating means as the gas supply pressure is reduced.

14. The governor according to claim 13, including means connecting the gas-pressure-responsive means to the fulcrum and operating to adjust the fulcrum as a non-linear function of the gas pressure, whereby to cause the load carried by the gas to be constant for any motor member position, within the load-carrying ability of a varying gas pressure.

15. In a governor for an engine operable on gaseous fuel, a governor output motor member movable along a fixed axis from an initial position in order to open a gas valve of the engine means for actuating the motor member, a lever connected to the motor member and having an arm extending normal to said axis in said initial position of the motor member, a shiftable fulcrum for the lever, means guiding the fulcrum for movement parallel to said direction of extent of said lever arm, gas-valve-operating means connected to said arm, and a gradually acting engine-gas-supply-pressure-responsive means connected to the fulcrum for movement of it along its guide whereby to modify the motor-member-imparted movement of the gas-valve-operating means as a function of gas supply pressure.

16. In a governor for an internal combustion engine having metering means for two fuels, the governor having a casing and motor means mounted thereon, together with means controlling the operation of the motor means, two mechanisms in the governor connected for operation by the motor means and each having output means for enabling engine operation through such metering means on the two fuels, fuel quality responsive means in the governor operable respectively on said two mechanisms to determine the times of operation of said mechanisms, the output means of the two mechanisms including coaxial rotary terminal shafts journalled in the casing and connected for operation by respective mechanisms.

17. In combination in a fuel control system for an internal combustion engine adapted for operation selectively on gaseous fuel and on liquid fuel, means providing a supply of gaseous fuel, means providing a supply of liquid fuel, separate conduit means connecting each supply means in fuel delivery association with the engine, a separate control means associated with each conduit means for regulating the quantity of fuel delivered to the engine through the associated conduit means, an engine speed responsive governor having a control member movable through a fixed range, an operating connection between said control member and said separate control means for simultaneous operation of the latter in response to governor movement of said control member in said range thereof, and means responsive to gaseous fuel in the conduit means connecting the gaseous fuel supply means in fuel delivery association with the engine, for rendering inoperative said operating connection between the governor control member and the control means regulating liquid fuel quantity delivery to the engine.

18. In combination in a fuel control system for an engine adapted for operation selectively on a gaseous fuel and on a liquid fuel, a manifold for gaseous fuel supply to the engine, a manifold for liquid fuel supply to the engine, a valve controlling the flow of gaseous fuel through said gas manifold, variable discharge pumping means connecting said liquid fuel conduit to the engine, means for adjusting the fuel discharge setting of the pumping means, a governor sensitive to engine speed and having a control arm movable through a fixed control range, said control arm being operatively connected to said valve and to said pump adjusting means to simultaneously actuate both said valve and said adjusting means as said control arm moves through its entire control range, and means responsive to the presence of gaseous fuel in said gas manifold to render ineffective the connection between said pump adjusting means and said governor control arm.

19. In combination in a fuel control system for an engine adapted to burn either a gas fuel or a liquid fuel, a manifold for gas fuel, a manifold for liquid fuel, separate means connecting each manifold to the combustion chamber of the engine, a separate adjusting means associated with each connecting means for varying the quantity of each fuel delivered to the engine through the associated connecting means, a governor responsive to changes in engine speed and having a control arm movable through a fixed range, said control arm being operatively connected to both of said adjusting means to simultaneously actuate the same as said control arm moves through its entire control range, and means responsive to the presence of gas in said gas manifold to render ineffective the actuating connection between said governor control arm and said liquid fuel adjusting means.

20. In a fuel control system for an engine adapted for operation selectively on a gaseous fuel and on a liquid fuel, the combination of, a manifold for gaseous fuel supply of the engine, valve means in said gas manifold for controlling the flow of gaseous fuel therethrough, variable-delivery pump means for supplying liquid fuel to the engine in quantity according to the delivery setting of the pump means, a linkage actuatable for determining the fuel delivery setting of said pump means between a predetermined minimum fuel delivery setting and maximum fuel delivery, a governor responsive to changes in engine speed and connected to said valve means and to said linkage for simultaneously actuating said valve means and the linkage, and means operatively associated with said linkage and effective in response to gaseous fuel under pressure in said gas manifold, to render said linkage ineffective to change the delivery setting of said pump means from its minimum fuel delivery setting.

21. In an internal combustion engine adapted for operation selectively on a gaseous fuel and a liquid fuel, a supply conduit for gaseous fuel delivery to the engine, a throttle valve in said conduit, a variable discharge pump for liquid fuel delivery to the engine, the pump having a member operable for effecting variations of pump discharge, engine speed responsive control means for operating said throttle valve, an operating connection for operation of the member to effect pump discharge variations, and means responsive to gaseous fuel in the conduit for rendering said operating connections ineffective to operate said member.

22. In an internal combustion engine adapted for operation selectively on a gaseous fuel and on a liquid fuel, a supply conduit for gaseous fuel delivery to the engine, variable discharge pump means for liquid fuel delivery to the engine, control means for varying the discharge of said pump means, and means responsive to the presence of gaseous fuel in said conduit for rendering said control means ineffective to vary the discharge of said pump means.

23. In an internal combustion engine adapted for operation selectively on a gaseous fuel and on a liquid fuel, a supply conduit for gaseous fuel delivery to the engine, a throttle valve in said conduit, variable discharge pump means for liquid fuel delivery to the engine, engine speed responsive control means for operating said throttle valve and varying the discharge of said pump means, and means responsive to gaseous fuel in said conduit for preventing pump discharge variations by said control means.

24. In combination in a fuel control system for an engine adapted for operation selectively on a gaseous fuel and on a liquid fuel, a manifold for gaseous fuel supply to the engine, a manifold for liquid fuel supply to the engine, a valve controlling the flow of gaseous fuel through the gas manifold, variable discharge pumping means connecting said liquid fuel manifold to the engine, means for adjusting the fuel discharge setting of said pumping means, a governor responsive to changes in engine speed and having a control member movable through a fixed control range, a rod actuated by said control member, a linkage connecting said rod to said pump adjusting means, a linkage connecting said rod to said valve for opening and closing the same, movement of said governor control member through its entire range being effective to simultaneously adjust the fuel delivery characteristics of said valve means and said variable pumping means, and means responsive to the pressure of gaseous fuel in said gas manifold to render the linkage between said rod and said pump adjusting means ineffective for varying the quantity of liquid fuel discharged by said pumping means.

References Cited in the file of this patent

UNITED STATES PATENTS

| | | |
|---|---|---|
| 2,179,628 | Heinzelmann | Nov. 14, 1939 |
| 2,245,562 | Becker | June 17, 1941 |
| 2,587,376 | Pelly et al. | Feb. 26, 1952 |
| 2,612,145 | Steven et al. | Sept. 30, 1952 |
| 2,696,807 | Junge et al. | Dec. 14, 1954 |